(No Model.)
J. COOPER & H. BIEG.
DRAIN AND SEWER PIPE.
No. 305,150. Patented Sept. 16, 1884.
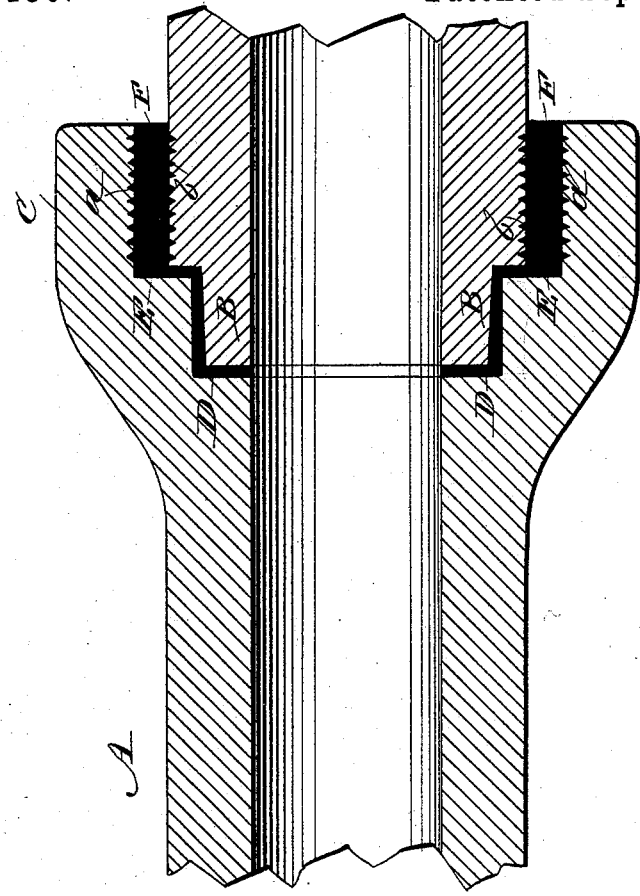
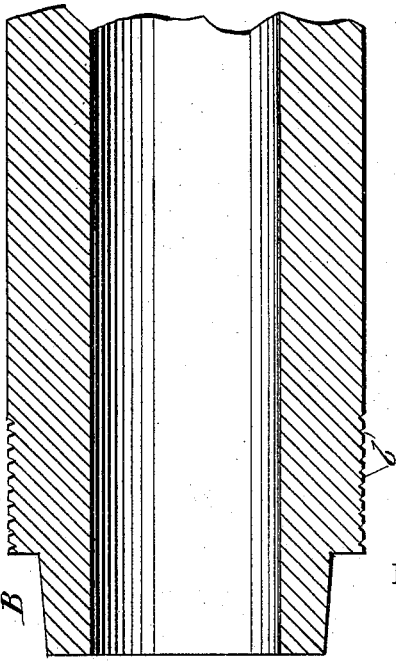
WITNESSES:
C. Sedgwick
Alfred H. Davis
INVENTOR:
J. Cooper
H. Bieg
BY
ATTORNEYS.

UNITED STATES PATENT OFFICE.

JOHN COOPER AND HENRY BIEG, OF BROOKLYN, NEW YORK.

DRAIN AND SEWER PIPE.

SPECIFICATION forming part of Letters Patent No. 305,150, dated September 16, 1884.

Application filed December 15, 1883. (No model.)

*To all whom it may concern:*

Be it known that we, JOHN COOPER and HENRY BIEG, of Brooklyn, Kings county, New York, have invented a new and Improved Drain and Sewer Pipe, of which the following is a full, clear, and exact description.

The object of our invention is to provide a new and improved drain and sewer pipe, which is so constructed that a series of the said pipes can be laid exactly level, the joints can be well cemented, and the said pipes are very strong and durable.

The invention consists of the detailed construction of the parts, substantially as hereinafter described, and pointed out in the claim.

Reference is to be had to the accompanying drawing, forming part of this specification, in which a longitudinal sectional elevation of our improved drain and sewer pipe is shown.

The pipe A is provided at one end with a neck, B, which is slightly beveled toward the outer end. At the opposite end the pipe is provided with a heavy annular flange, C, projecting beyond the end of the main body of the pipe, the inner end of the outer surface of the said flange being beveled toward the outer surface of the pipe, for the purpose of strengthening the inner end of the flange, and also for giving the pipe a better finish. The flange C is provided on its inner surface with two shoulders, D and E, of which the former, D, is formed at the end of the pipe A, and the latter shoulder, E, is formed the length of the neck B from the shoulder D. The depth of the shoulder D is about equal to the thickness of the neck B, and the depth of the shoulder E is slightly greater than the thickness of the pipe A, so that an annular space will be formed between the outer surface of the pipe A and the inner surface of the flange, as shown. That part of the inner surface of the flange between the outer end of the flange and the shoulder E is provided with circumferential grooves $a$, and that end of the pipe A at which the collar B is formed is provided with circumferential grooves $b$ in the outer surface. That end of the pipe A provided with the neck B is passed into the socket formed by the flange C, and then the space between the outer surface of the pipe and the inner surface of the flange is filled with cement F, as shown. The heavy flange C strengthens the pipe, and at the same time gives the pipe a good bearing, thus permitting of laying a line of pipes perfectly level, and relieves the cement in space F from vertical weight and consequent derangement of the joint.

The socket leading to flange D may be packed with a water-proof putty, if desired, thus forming a double water-proof joint.

Having thus described our invention, we claim as new and desire to secure by Letters Patent—

In a drain or sewer pipe, the pipe-section provided at one end with a flange forming a socket having internal annular grooves and two inner annular shoulders, said pipe-section having at its opposite end a tapered neck and external annular grooves, substantially as and for the purpose set forth.

JOHN COOPER.
HENRY BIEG.

Witnesses:
OSCAR F. GUNZ,
C. SEDGWICK.